United States Patent
Carter, Jr.

[11] Patent Number: 5,865,399
[45] Date of Patent: Feb. 2, 1999

[54] TAIL BOOM FOR AIRCRAFT

[75] Inventor: Jay W. Carter, Jr., Burkburnett, Tex.

[73] Assignee: Cartercopters, L.L.C., Wichita Falls, Tex.

[21] Appl. No.: 985,560

[22] Filed: Dec. 5, 1997

Related U.S. Application Data

[60] Provisional application No. 60/032,137 Dec. 9, 1996.

[51] Int. Cl.⁶ .......................... B64C 27/22; B64C 25/02; B64D 27/02
[52] U.S. Cl. .............................................. 244/54
[58] Field of Search .................. 244/7 A, 102 R, 244/17.15, 17.17, 17.21, 54, 87, 88, 121, 109, 17.19

[56] References Cited

U.S. PATENT DOCUMENTS

| | | | |
|---|---|---|---|
| 2,521,684 | 9/1950 | Bates | 244/17.13 |
| 2,879,013 | 3/1959 | Herrick | 244/7 A |
| 3,002,569 | 10/1961 | Doblhoff | |
| 3,558,082 | 1/1971 | Bennie | 244/17.21 |
| 3,563,493 | 2/1971 | Zuck | 244/7 A |
| 4,611,774 | 9/1986 | Brand | 244/54 |
| 4,624,425 | 11/1986 | Austin et al. | 244/54 |
| 4,662,582 | 5/1987 | Brand | 244/54 |
| 5,209,431 | 5/1993 | Bernard et al. | 244/17.17 |

Primary Examiner—Virna Lissi Mojica
Attorney, Agent, or Firm—James E. Bradley

[57] ABSTRACT

An aircraft of the type having retractable landing gear and a pusher propeller is provided with a twin tail boom. The tail boom has a configuration to prevent the lowermost point of the pusher propeller from contacting a landing surface when landing the aircraft, even with the landing gear retracted, so that the engine of the aircraft is not damaged as a result of the pusher propeller being unable to rotate during the landing.

13 Claims, 3 Drawing Sheets ical arrangement of the landing gear is common to most modern aircraft and is known as a tricycle gear arrangement.
TAIL BOOM FOR AIRCRAFT This application claims the benefit of U.S. provisional application No. 60/032,137, filed Dec. 9, 1996.

TECHNICAL FIELD

This invention relates in general to aircraft, and in particular, to propeller driven aircraft, more particularly to aircraft having aft-mounted, push-type propellers.

BACKGROUND ART

Traditionally in aircraft of all designs that have retractable landing gear, if the landing gear fails to extend or more commonly the pilot forgets to extend it, the propeller hits the ground, destroying the propeller and causing costly damage to the engine. In comparison, the damage to the airframe is usually more easily repairable.

Accordingly, a primary object of the invention is to provide an aircraft design in which a landing gear up landing does not lead to engine or propeller damage.

The above as well as additional objects, features, and advantages of the invention will become apparent in the following detailed description.

DISCLOSURE OF INVENTION

An aircraft of the type having retractable landing gear, a fuselage with a wing extending outward from the fuselage and a propeller mounted rearward of the fuselage, is provided with a pair of tail booms that extend rearward from the wing. The propeller is located between the tail booms. The tail booms are configured to support the aircraft during a retracted-landing-gear landing on a generally level landing surface so that the lowermost point of the propeller is prevented from contacting the landing surface when the aircraft contacts the landing surface.

BEST MODE FOR CARRYING OUT INVENTION

Figure 1:
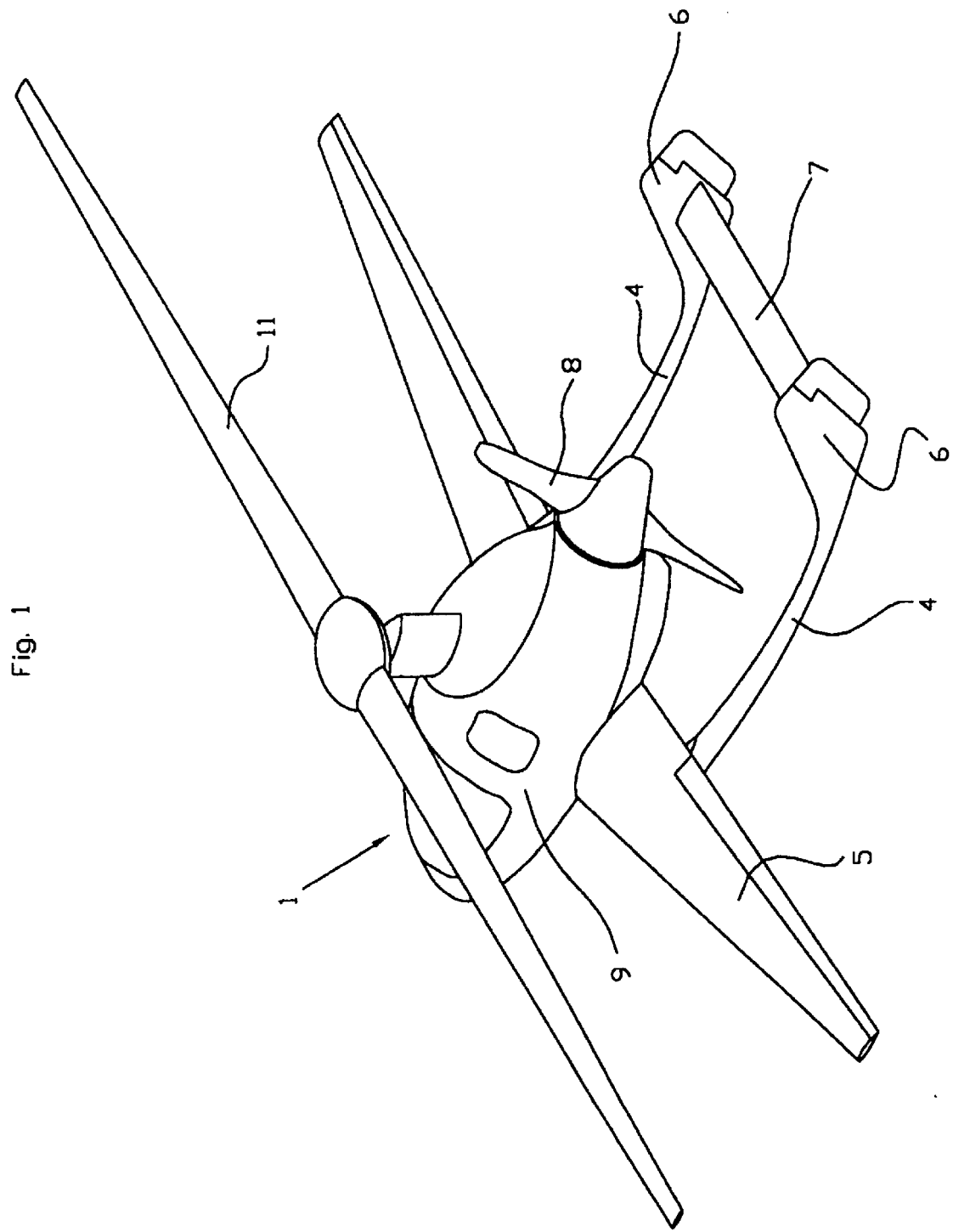
FIG. 1 is a rear perspective view of an aircraft having tail booms and a pusher propeller.

FIG. 1 shows a rear perspective view of a gyroplane 1 (an aircraft having both a rotor and a wing). Wing 5 extends laterally outward from opposite sides of the aircraft fuselage 9. Arc-shaped booms 4 extend rearward from wing 5, with the booms 4 being laterally spaced apart. Each boom 4 includes a vertical stabilizer 6 located at the rearward end of the boom 4. Extending between the two vertical stabilizers 6 is a horizontal stabilizer 7. Propeller 8 is mounted on the aft end of a pod-type fuselage 9 to the rear of the wings 5 and is positioned between the two booms 4. A rotor 11 is mounted above the fuselage 9 and provides lift for the aircraft. The propeller 8 pushes gyroplane 1 through the air. A motor (not shown) is housed within the fuselage 9 for powering the propeller 8.

Figure 2:
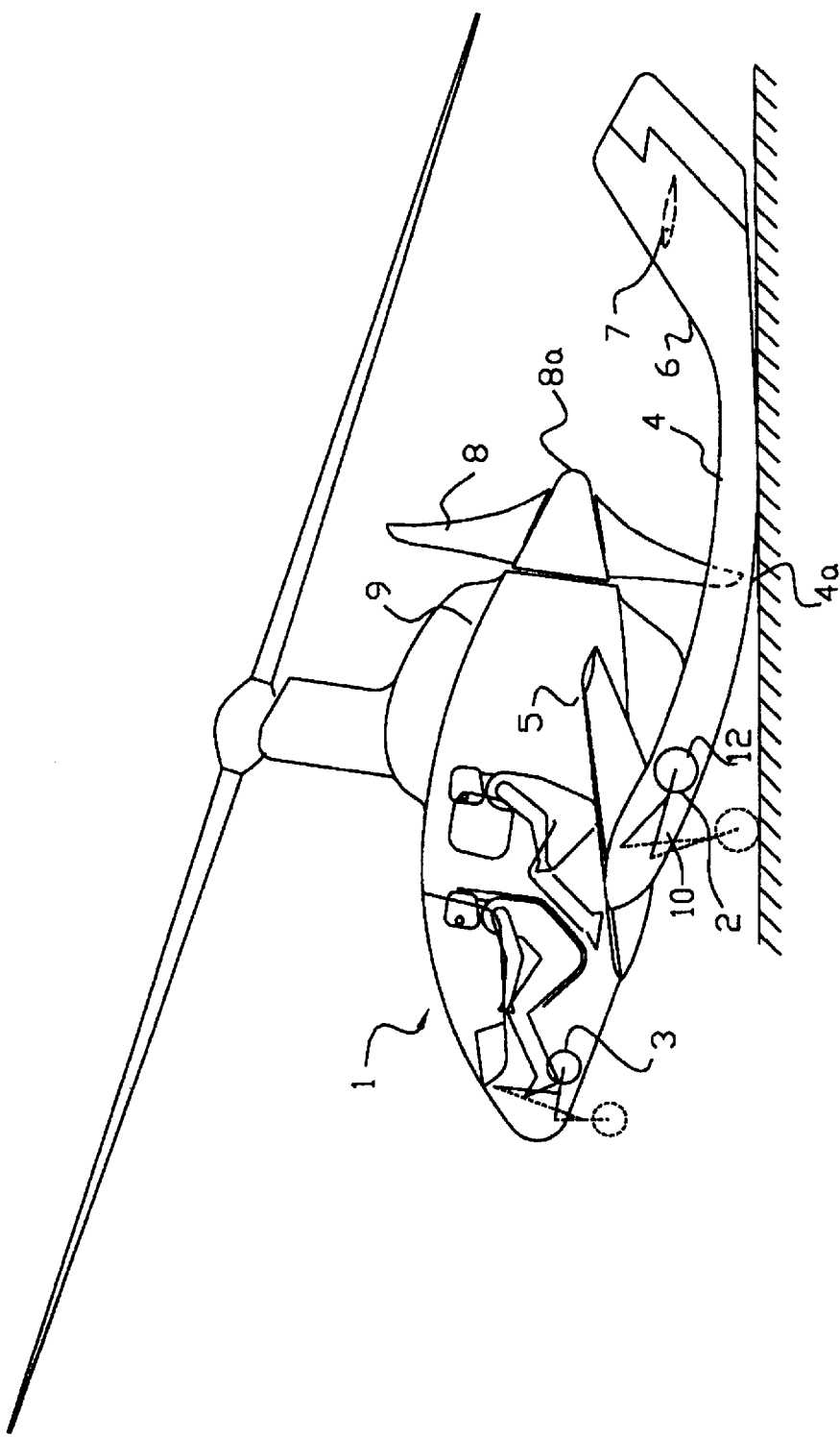
FIG. 2 shows a side view of the aircraft of FIG. 1, landing with gear up, flaring in a nose-up pitch attitude. Dotted lines show landing gear down.

FIG. 2 shows a side view of gyroplane 1, landing in a nose up attitude. Each boom 4 is arced along its length with the convex side of the arc facing downward. Gyroplane 1 has two rearward retractable main landing gear 2 housed within the booms 4, and one forward retractable nose landing gear 3 housed within the nose of the aircraft. This geometrical arrangement of the landing gear is common to most modern aircraft and is known as a tricycle gear arrangement.

Booms 4 are formed at a gradual curve from the forward to the rearward end. The curved boom 4 is shaped to provide a relatively low aerodynamic drag, with the boom 4 having a very small angle relative to the airstream. The cross section of boom 4 taken in the direction of air flow should be configured to minimize air drag. If booms 4 are approximately cylindrical in shape, the cross section of booms 4 taken in the direction of air flow approximates a very elongated ellipse. An ellipse is a fairly low drag shape, but it tends to suffer from turbulent separation at the trailing edge. However, since booms 4 are at such a slight angle to the airstream, the air leaving the trailing edge of the ellipse tends to follow the surface of booms 4 instead of separating.

Figure 3:
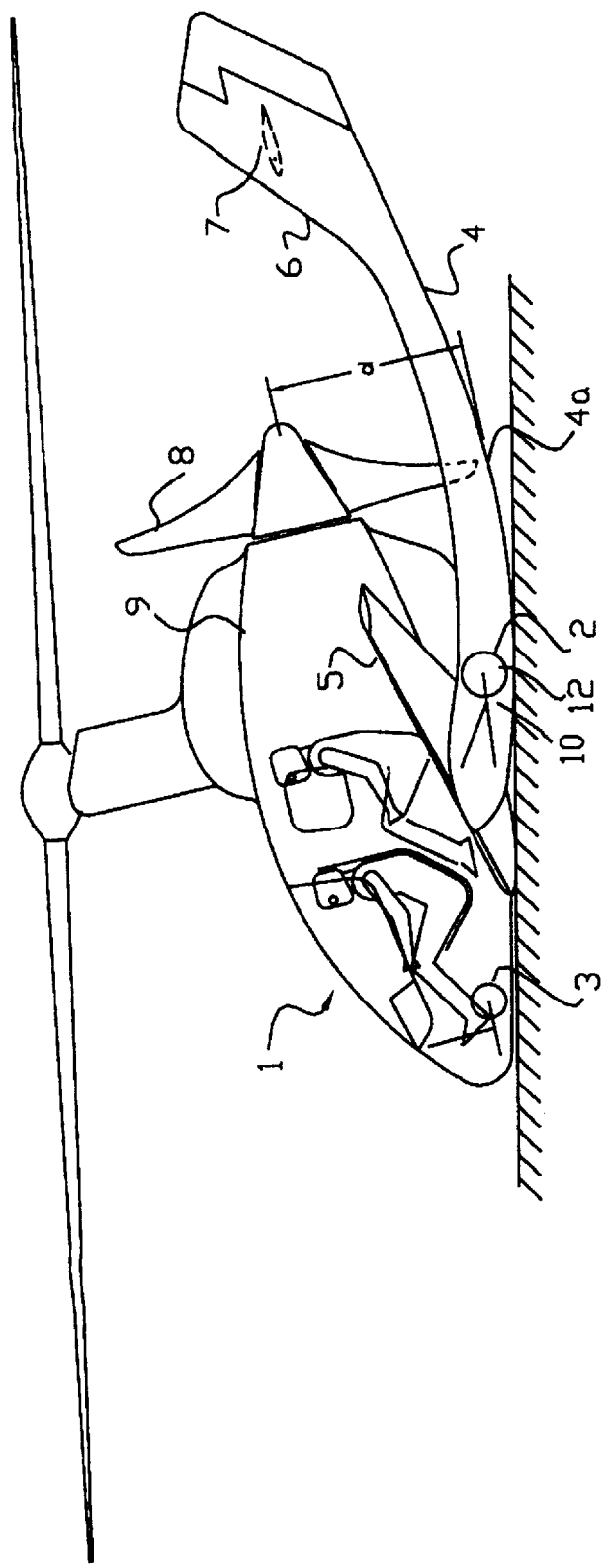
FIG. 3 shows a side view of the aircraft of FIG. 1, landing with gear up, in a nose down pitch attitude.

In a normal landing, gyroplane 1 is supported by landing gear 2 and 3. However, retractable landing gear can fail or the pilot may forget to extend them, resulting in a landing with the landing gear still retracted. For that situation, as shown in FIGS. 2 and 3, lower portions 4a of the booms 4 are located at a position below the lowest point of propeller 8 when the gyroplane 1 is generally in an upright pitch and roll attitude, such that the propeller blade tips will not hit level ground or other support surface in case of a gear-up landing. Each boom lower side portion 4a is directly adjacent to the tips of propeller 8. A transverse line drawn between lower side portions 4a is a greater distance d from propeller hub 8a than the radius of propeller 8a. FIG. 2 shows the aircraft 1 in flare, with the nose up, showing that when booms 4 contact the ground, the lowermost point of the propeller 8 is prevented from hitting the ground. Dotted lines indicate the normal position of the landing gear when they are extended.

FIG. 3 shows the aircraft 1 landing nose down (such as might occur in a slide to a stop during a gear up landing), showing that wing 5 and booms 4 contact the ground while propeller 8 is prevented from touching the ground.

If the ground has a substantial convex crown at the point of contact, propeller 8 may hit, but since only a slight portion of the propeller tip is likely to hit, the propeller is unlikely to stop suddenly, which is the usual cause of severe engine damage.

In the preferred embodiment, the main landing gear 2 is retracted into wells 10 formed in the tail booms 4, so the tail booms 4 extend below the wing 5 to provide room for the retracted wheels 12. From just aft of the wheel wells 10, tail booms 4 curve downward further, as they pass the propeller 8, and then curve upward toward vertical stabilizers 6.

The invention is an improvement over other aircraft designs in that the pusher propeller does not hit the landing surface even when the landing gear is retracted. This is an advantage since destroying the propeller can causing costly damage to the engine. In comparison, the damage to the airframe is usually more easily repairable.

While the invention is shown in only one of its embodiments it is not so limited but is susceptible to various changes without departing from the scope of the invention.

I claim:

1. In an aircraft of the type having retractable landing gears, the aircraft having a fuselage with a wing extending outward from the fuselage, a propeller mounted rearward of the fuselage, and a pair of tail booms extending rearward from the wing, the propeller being located between the tail booms, the improvement comprising:

the tail booms being configured to support the aircraft during a retracted-landing-gear landing on a generally level landing surface so that the lowermost point of the propeller is prevented from contacting the landing surface when the aircraft contacts the landing surface; and wherein there are three of the landing gears and wherein two of the landing gears are mounted to and retract within the tail booms.

2. The aircraft of claim 1, wherein:

each of the tail booms has a vertical stabilizer at a rearward end.

3. A gyroplane, comprising in combination:

a fuselage;

a wing extending outward from the fuselage;

a rotor rotatably mounted above the fuselage;

a pair of tail booms extending rearward from the wing, each of the tail booms having a vertical stabilizer at a rearward end;

a horizontal stabilizer that extends between the rearward ends of the tail booms;

a pusher propeller mounted rearward of the fuselage between the tail booms and forward of the horizontal stabilizer;

retractable landing gears which support the tail booms and fuselage above a landing surface while in an extended position and which retract for flight; and a lower surface portion on a lower surface of each of the tail booms adjacent the propeller which is positioned such that a transverse line extending between the lower surface portions is at a distance from a hub of the propeller which is greater than a radius of the propeller, to prevent the propeller from contacting a landing surface if the aircraft lands with the landing gears in a retracted position.

4. The aircraft of claim 1, further comprising:

a horizontal stabilizer that extends between a rearward end of the tail booms.

5. The aircraft of claim 1, wherein:

each of the tail booms has a lower surface which is curved along the length of each of the tail booms.

6. The aircraft of claim 1, further comprising:

a rotor rotatably mounted above the fuselage.

7. In an aircraft of the type having retractable landing gears, the aircraft having a fuselage with a wing extending outward from the fuselage, a propeller mounted rearward of the fuselage, and a pair of tail booms extending rearward from the wing, the propeller being located between the tail booms, the improvement comprising:

a lower surface portion on a lower surface of each of the tail booms adjacent the propeller which is positioned such that a transverse line extending between the lower surface portions is at a distance from a hub of the propeller which is greater than a radius of the propeller, to reduce the chances of the propeller contacting a landing surface; and wherein there are three of the landing gears and wherein two of the landing gears retract within wells formed in the tail booms.

8. The aircraft of claim 7, wherein:

each of the tail booms has a vertical stabilizer at a rearward end.

9. The gyroplane of claim 3, wherein:

the lower surfaces of each of the tail booms curve along the length of each of the tail booms.

10. The aircraft of claim 7, further comprising:

a horizontal stabilizer that extends between rearward ends of the tail booms.

11. The aircraft of claim 7, wherein:

the lower surface of each of the tail booms curves along the length of each of the tail booms.

12. The aircraft of claim 7, further comprising:

a rotor rotatably mounted above the fuselage.

13. The gyroplane of claim 3, wherein there are three of the landing gears and wherein:

two of the landing gears retract within wells formed in the tail booms.

* * * * *